(12) United States Patent
Clegg et al.

(10) Patent No.: US 7,810,719 B2
(45) Date of Patent: Oct. 12, 2010

(54) TRANSACTION PRODUCT WITH INFLATABLE ARTICLE

(75) Inventors: Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 395 days.

(21) Appl. No.: 11/965,472

(22) Filed: Dec. 27, 2007

(65) Prior Publication Data

US 2009/0166432 A1     Jul. 2, 2009

(51) Int. Cl.
G06K 5/00     (2006.01)
G06K 7/08     (2006.01)

(52) U.S. Cl. .................. 235/380; 235/375; 235/449; 235/451; 235/487; 235/492; 235/493; 40/124.01; 40/124.06; 40/124.07; 40/124.08; 40/124.09

(58) Field of Classification Search .............. 235/375, 235/380, 449, 487, 492, 493, 451; 40/124.01, 40/124.06–124.11; 705/39–45; 446/220
See application file for complete search history.

(56) References Cited

U.S. PATENT DOCUMENTS

| | | | |
|---|---|---|---|
| 3,589,047 A | 6/1971 | Hess et al. | |
| 4,857,029 A | 8/1989 | Dierick et al. | |
| 5,009,624 A | 4/1991 | Estam-Goggin | |
| 5,480,339 A | 1/1996 | Wu | |
| 5,573,437 A * | 11/1996 | Van Dyke et al. | 446/75 |
| 5,797,783 A * | 8/1998 | Harris | 446/77 |
| 5,819,448 A | 10/1998 | Kieves et al. | |
| 5,852,889 A | 12/1998 | Rinaldi | |
| 5,890,744 A * | 4/1999 | Chan | 283/117 |
| 6,348,248 B1 | 2/2002 | Randolph | |
| 6,663,455 B1 | 12/2003 | Lang | |
| 6,978,561 B1 | 12/2005 | Hunter | |
| 2002/0143697 A1 * | 10/2002 | Gotfried | 705/39 |
| 2006/0208062 A1 | 9/2006 | Osborn et al. | |
| 2007/0194128 A1 | 8/2007 | Coe et al. | |
| 2007/0241186 A1 | 10/2007 | Lindahl et al. | |
| 2007/0241197 A1 | 10/2007 | Lindahl et al. | |

OTHER PUBLICATIONS

"Stored-Value Card With Chemical Luminescense," U.S. Appl. No. 11/510,264, filed Aug. 25, 2006.
"Inflatable Financial Transaction Product," U.S. Appl. No. 11/592,713, filed Nov. 3, 2006.
"Stored-Value Product With Housed Article," U.S. Appl. No. 11/697,271, filed Apr. 5, 2007.
"Transaction Product With Removable Articles," U.S. Appl. No. 11/843,844, filed Aug. 23, 2007.
"Transaction Product With Gelatinous Substance," U.S. Appl. No. 11/843,855, filed Aug. 23, 2007.

* cited by examiner

Primary Examiner—Thien M. Le
Assistant Examiner—Tuyen K Vo
(74) Attorney, Agent, or Firm—Griffiths & Seaton PLLC

(57) ABSTRACT

A transaction product includes a housing, an article and an account identifier. The article is selectively maintained within the housing. Following removal of the article from the housing, the article is configured to self-inflate upon activation of the article by a bearer of the transaction product. The account identifier is associated with the housing and links the transaction product to an account or record having a value configured to be used toward one or more of a purchase and a use of goods or services.

21 Claims, 12 Drawing Sheets

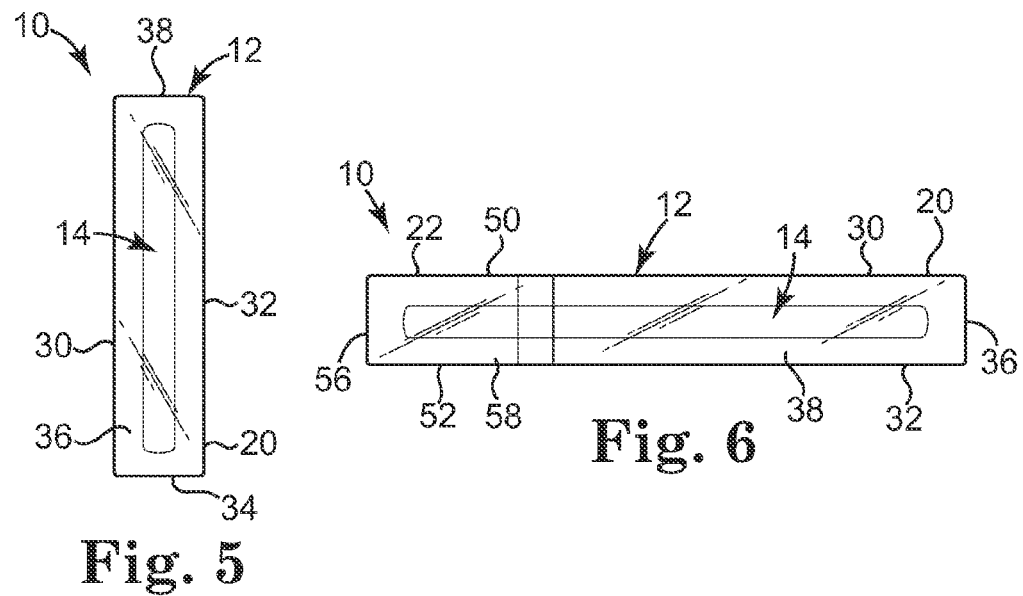
Fig. 5
Fig. 6
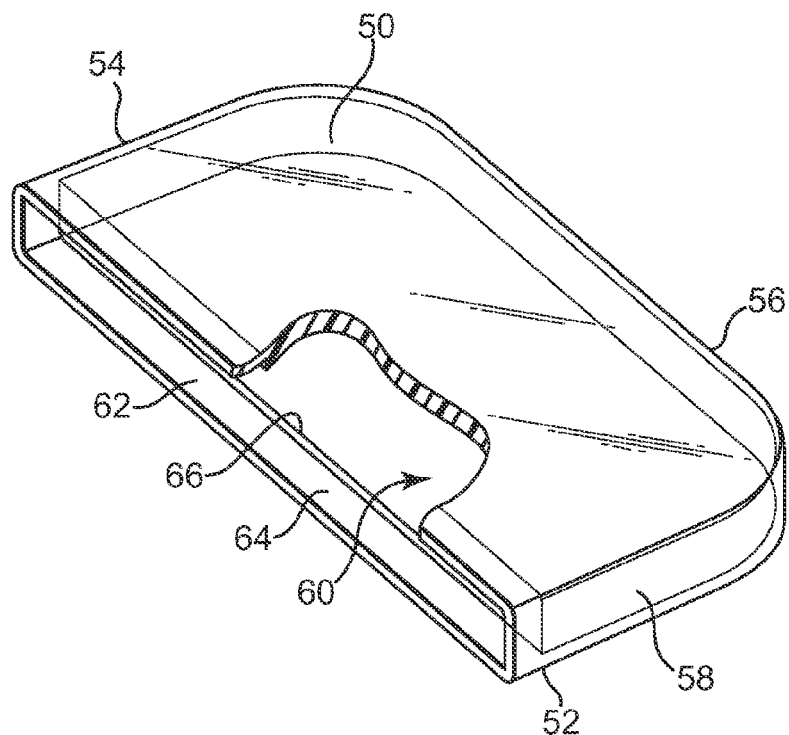
Fig. 7

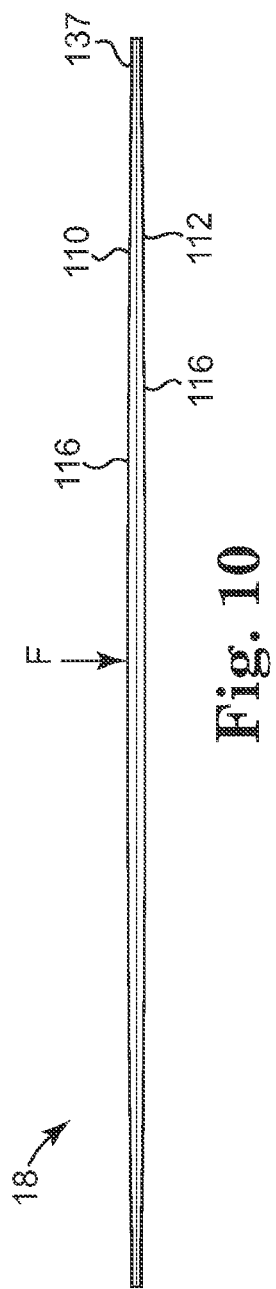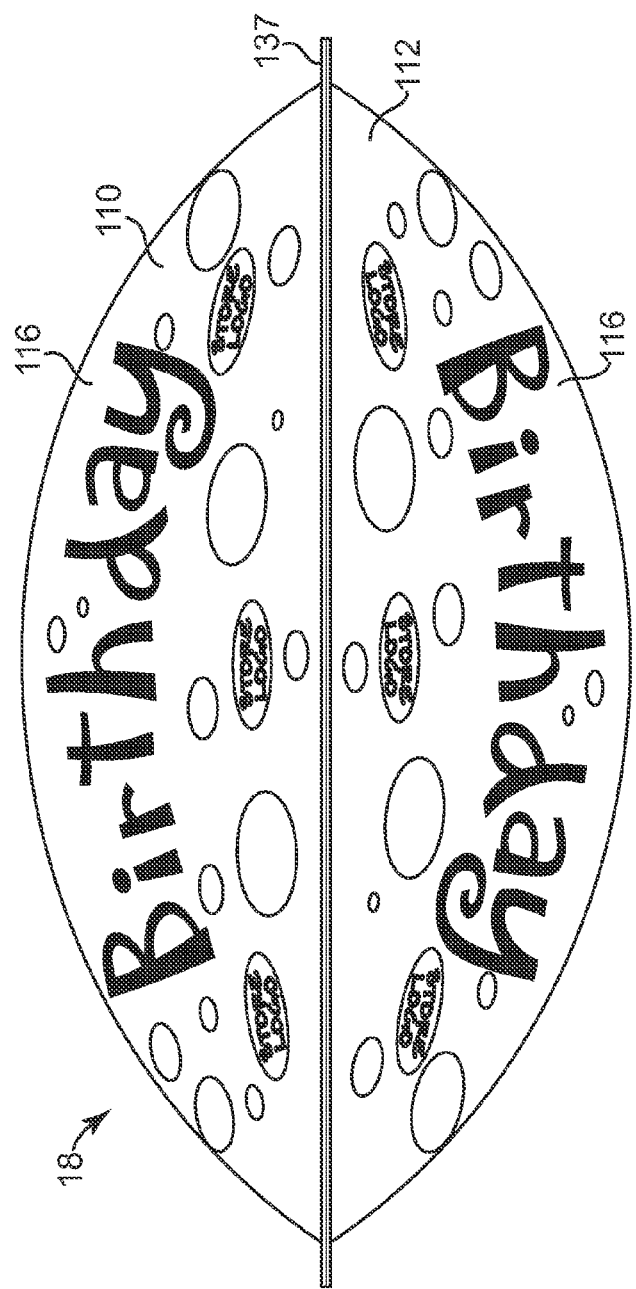

TRANSACTION PRODUCT WITH INFLATABLE ARTICLE

BACKGROUND OF THE INVENTION

Stored-value cards and other transaction products come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Transaction products provide a number of advantages to both the consumer and the retailer.

SUMMARY

One aspect of the present invention relates to a transaction product including a housing, an article and an account identifier. The article is selectively maintained within the housing. Following removal of the article from the housing, the article is configured to self-inflate upon activation of the article by a bearer of the transaction product. The account identifier is associated with the housing and links the transaction product to an account or record having a value configured to be used toward one or more of a purchase and a use of goods or services. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 5 is a right side view illustration of the transaction product of FIG. 2, the left side view being a mirror image thereof.

FIG. 6 is a top view illustration of the transaction product of FIG. 2, the bottom view being a mirror image thereof.

FIG. 7 is a partial perspective view illustration of a second housing member of the transaction product of FIG. 1, according to one embodiment of the present invention.

FIG. 10 is a side view of the balloon of FIG. 9 in a deflated position, according to one embodiment of the present invention.

FIG. 11 is a side view of the balloon of FIG. 9 in an inflated position, according to one embodiment of the present invention.

DETAILED DESCRIPTION

Figure 1:
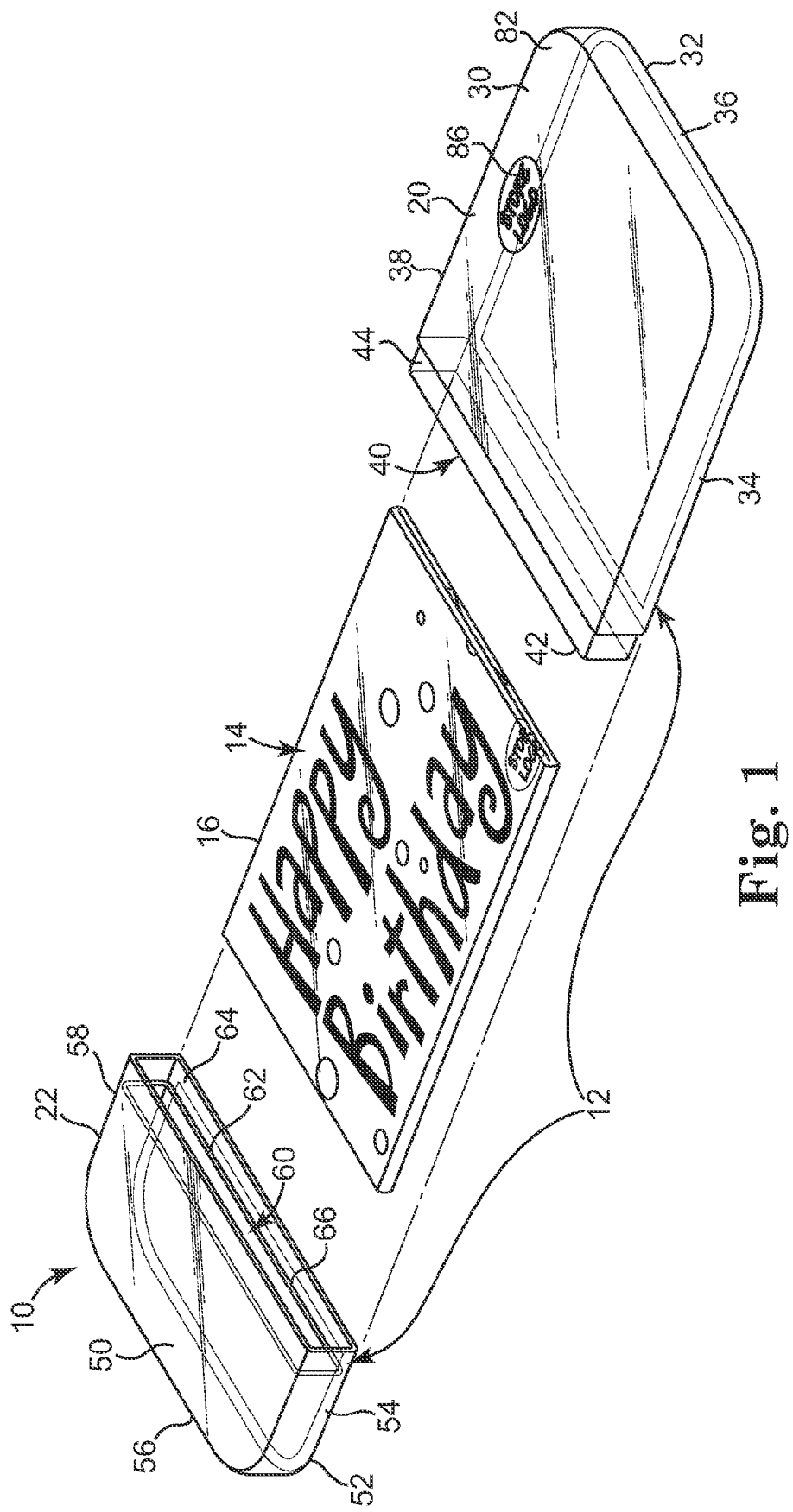
FIG. 1 is an exploded perspective view illustration of a transaction product, according to one embodiment of the present invention.
Figure 2:
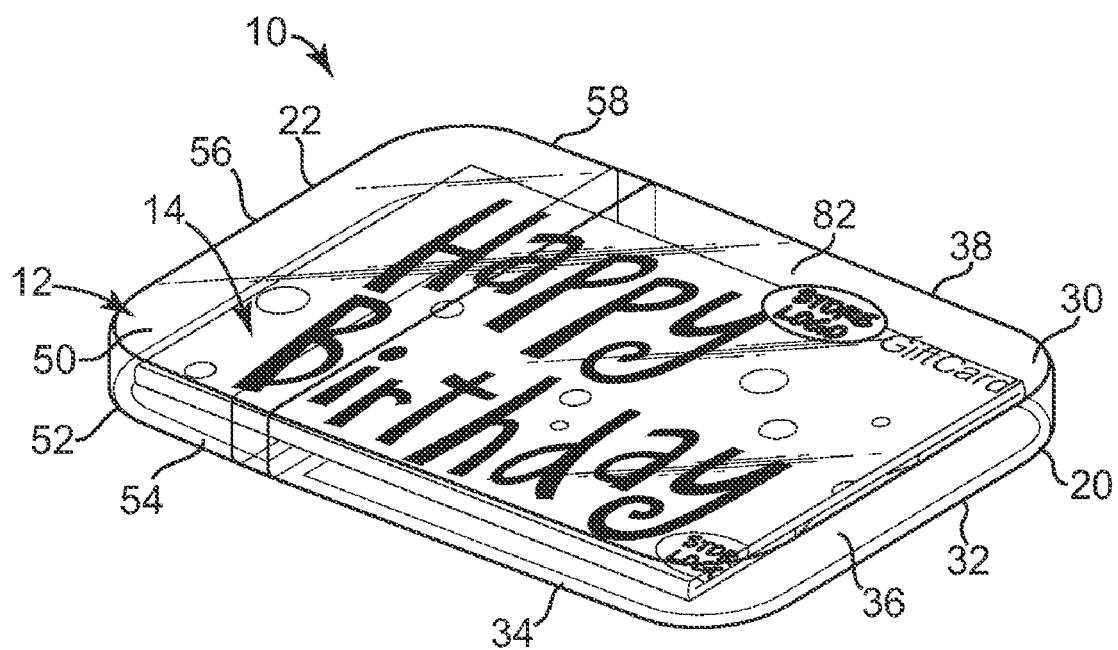
FIG. 2 is a perspective view illustration of a transaction product, according to one embodiment of the present invention.
Figure 3:
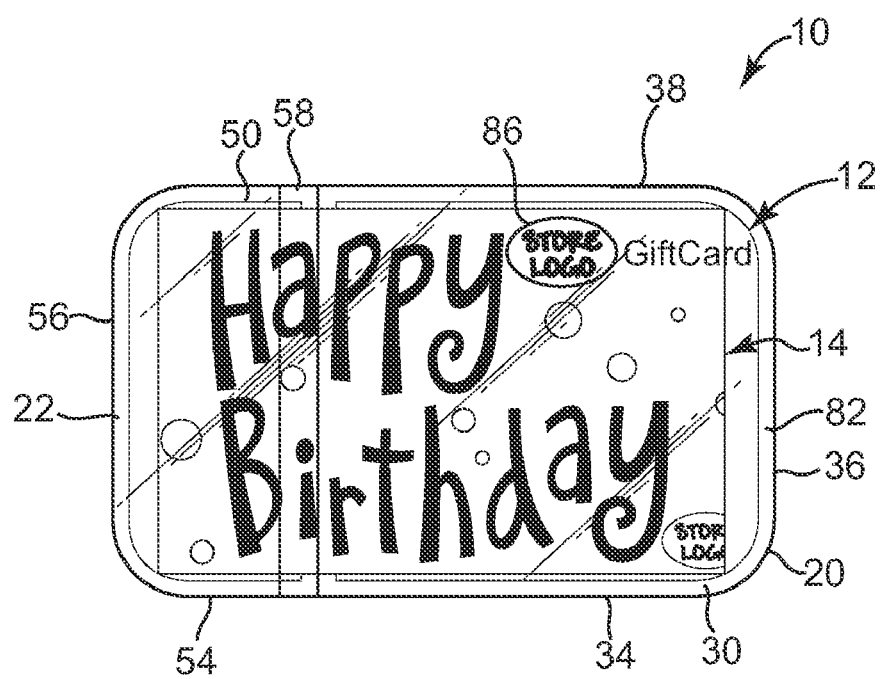
FIG. 3 is a front view illustration of the transaction product of FIG. 2.

Stored-value cards and other transaction products are adapted for making purchases of goods and/or services at, for example, a retail store or website and/or for storing non-monetary value adapted for redemption toward the use of goods and/or services (e.g., a phone card). According to one embodiment, an original consumer buys a transaction product to give a recipient who in turn is able to use the transaction product at a retail store or setting to pay for the goods and/or services. A transaction product, according to embodiments of the present invention, provides the consumer and recipient with extra amusement and non-transactional functionality in addition to the ability to pay for goods and/or services with the transaction product.

In particular, in one embodiment, the transaction product includes a housing enclosing an inflatable article such as a balloon. The housing is configured to be selectively opened and closed to allow access to the balloon. In one embodiment, once the balloon is removed from the housing, a bearer of the balloon impacts the balloon, which causes the balloon to automatically inflate to the amusement of the bearer. The housing with or without the balloon maintained therein is configured for use toward the purchase or use of one or more of goods and/or services. In one embodiment, the inclusion of the housing and the balloon as part of the transaction product promotes the sale and/or loading of the transaction product by potential consumers and/or bearers of the transaction product.

Turning to the figures, FIGS. 1-6 illustrate a transaction product 10 (e.g., a financial transaction product and/or stored-value card) according to one embodiment of the present invention. Transaction product 10 includes a casing or housing 12 selectively maintaining a packaged article 14 therein. In one embodiment, packaged article 14 includes a package 16 and an inflatable article such as a balloon 18 (FIGS. 8-11) as will be further described below. In one embodiment, package 16 is eliminated and balloon 18 is directly placed in housing 12.

In one embodiment, housing 12 is substantially rigid and includes a first housing member 20 and a second housing member 22 configured to be selectively coupled with first housing member 20. First housing member 20 includes a first major panel 30 and a second major panel 32 spaced from and extending substantially parallel with one another. In one embodiment, first and second major panels 30 and 32 are each substantially planar and are similarly sized and shaped. In one example, each of first and second major panels 30 and 32 is substantially rectangular. Side walls 34, 36 and 38 each extend from a different side of and between first and second major panels 30 and 32. More specifically, where first and second major panels 30 and 32 are each substantially rectangular, first side wall 34 extends substantially parallel to third side wall 38, and second side wall 36 extends between first side wall 34 and third side wall 38. In view of this configuration, first housing member 20 defines a chamber 40 (generally indicated in FIG. 1) therebetween, which is substantially enclosed except for an opening 42 defined opposite second side wall 36.

In one embodiment, a flange 44 (FIG. 1) extends around opening 42 from ends of each of first major panel 30, second major panel 32, first side wall 34 and third side wall 38 positioned opposite second side wall 36 (e.g., adjacent opening 42). More specifically, flange 44 extends substantially parallel to, but inwardly offset from each of first and second major panels 30 and 32 and first and third side walls 34 and 38 away from second side wall 36.

Referring to FIGS. 1 and 7, second housing member 22 includes first and second major panels 50 and 52. In one embodiment, first and second major panels 50 and 52 are substantially planar and are spaced from and extend substantially parallel with one another. First and second major panels 50 and 52 are similarly sized and shaped. For instance, in one example, first and second major panels 50 and 52 are each substantially rectangular. Side walls 54, 56 and 58 each extend from a different side of and between first and second major panels 50 and 52. More specifically, first side wall 54 extends substantially parallel to third side wall 58, and second side wall 56 extends between first and third side walls 54 and 58. In view of this configuration, second housing member 22 defines a cavity 60, which is substantially enclosed except for an opening 62 defined opposite second side wall 56.

First and second major panels 50 and 52 and first and third side walls 54 and 58 collectively define an area of reduced thickness 64 of second housing member 22 near and around opening 62. As such, a raised lip 66 is formed inside second housing member 22 at a boundary defined between area of reduced thickness 64 and the remainder of second housing member 22. In one embodiment, area of reduced thickness 64 extends from opening 62 a distance similar to a distance flange 44 extends from opening 42 of first housing member 20 (FIG. 1). As such, area of reduced thickness 64 is configured to receive flange 44 of first housing member 20 as will be further described below.

In one embodiment, first and second housing members 20 and 22 are each formed by injection molding plastic (e.g., polycarbonate, polystyrene, polyvinyl chloride (PVC), acrylonitrile butadiene styrene (ABS), acrylonitrile styrene, polyethylene terephthalate (PET), teslin, polyactide (PLA) or acrylic) or other suitable material to define the various attributes of first and second housing members 20 and 22. In one embodiment, at least one of first and second housing members 20 and 22 is translucent or transparent. In one example, first and second housing members 20 and 22 are each substantially rigid.

Figure 4:
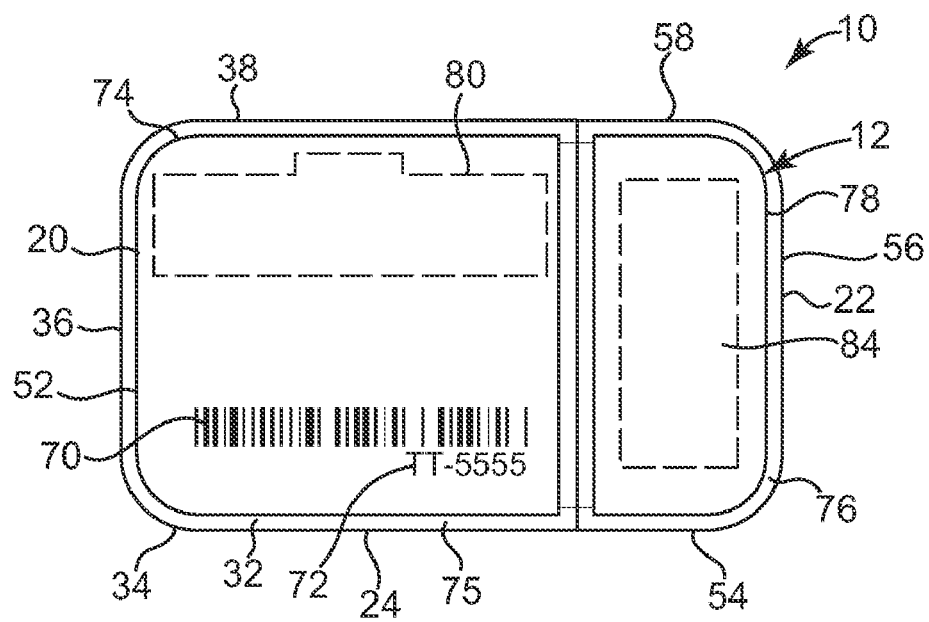
FIG. 4 is a rear view illustration of the transaction product of FIG. 2.

Referring to the rear view of FIG. 4, an account identifier 70 is included on or is otherwise associated with housing 12, for example, on an outside surface 75 of second major panel 32. Account identifier 70 indicates an account or record to which transaction product 10 is linked. The account or record maintains a monetary or other value balance on transaction product 10 and is optionally stored on a database, other electronic or manual record-keeping system or in the case of "smart" cards for example, on a chip or other electronic device on transaction product 10 itself. Accordingly, by scanning or otherwise reading account identifier 70, the account or record linked to transaction product 10 is identified and can subsequently be activated, have amounts debited therefrom and/or have amounts added thereto.

In one embodiment, account identifier 70 includes one or more of a bar code, magnetic strip, smart chip or other electronic device, radio frequency identification (RFID) device or other suitable marking readily readable by a point-of-sale terminal, account access station, kiosk or other suitable machine or device. In one embodiment, account identifier 70 includes a character string or code 72 (e.g., a number and/or letter string) configured to provide additional security to the use of transaction product 10 and/or configured to be read by a bearer of transaction product 10 to facilitate use of transaction product 10 for web site or other purchases outside of a brick-and-mortar type retail establishments. With the above in mind, account identifier 70 is one example of means for linking transaction product 10 with an account or record, and scanning and/or otherwise reading account identifier 70 are examples of means for activating or loading value on transaction product 10.

In one example where housing 12 is translucent or transparent, an opaque field 74 is printed or otherwise applied to an outside surface 75 of second major panel 32 of housing 12. In one embodiment, opaque field 74 extends across a substantial entirety of outside surface 75 to substantially block viewing of corresponding chamber 40 (FIG. 1) through outside surface 75. In one embodiment, outside surface 75 is otherwise configured to be opaque. In one embodiment, opaque field 74 is configured to be printed with or to otherwise receive at least a portion of account identifier 70. In the case of a bar code account identifier 70, opaque field 74 facilitates machine scanning of account identifier 70. In one embodiment, an outside surface 76 of second major panel 52 of housing 12 is at least partially covered with an opaque field 78 similar to opaque field 74.

In one embodiment, redemption indicia 80, generally indicated as a dashed box in FIG. 4, are included on housing 12, such as on opaque field 74 or opaque field 78. Redemption indicia 80 indicate that transaction product 10 is redeemable toward the purchase or use of goods and/or services, and that, upon use, a value of the purchased or used goods and/or services will be deducted from the account or record linked to transaction product 10. In one embodiment, redemption indicia 80 include phrases such as "<NAME OF STORE> GiftCard" and "This GiftCard is redeemable for merchandise or services at any of our stores or at our website," and/or provides help or telephone information in a case of a lost, stolen or damaged transaction product, etc.

In one embodiment, other indicia are printed or otherwise disposed on one or more of outside surface 82 of first major panel 30 and or outside surface 75 of second major panel 32. For example, instructional indicia 84, generally indicated as a dashed box in FIG. 4, may be included on one or more of outside surface 75 and outside surface 82 and provide instruction regarding how to use non-transactional features of transaction product 10. For example, instructional indicia 84 describe with pictures and/or text that to inflate balloon 18, the bearer should squeeze or otherwise impact the balloon 18 and shake the balloon 18 to speed inflation of balloon 18. Other indicia may be included on first housing member 20 and second housing member 22 such as other objects, text, backgrounds, graphics, brand identifiers, etc. In one example, additional indicia 86 include decorative and/or informative items, such as objects relating to the nature of transaction product 10 and or to brand, store, product or other related items (e.g., a logo, trademark or mascot). Other suitable combinations or selections of indicia 80, 84 and 86 or other indicia to be displayed on housing 12 are also contemplated.

Figure 8:
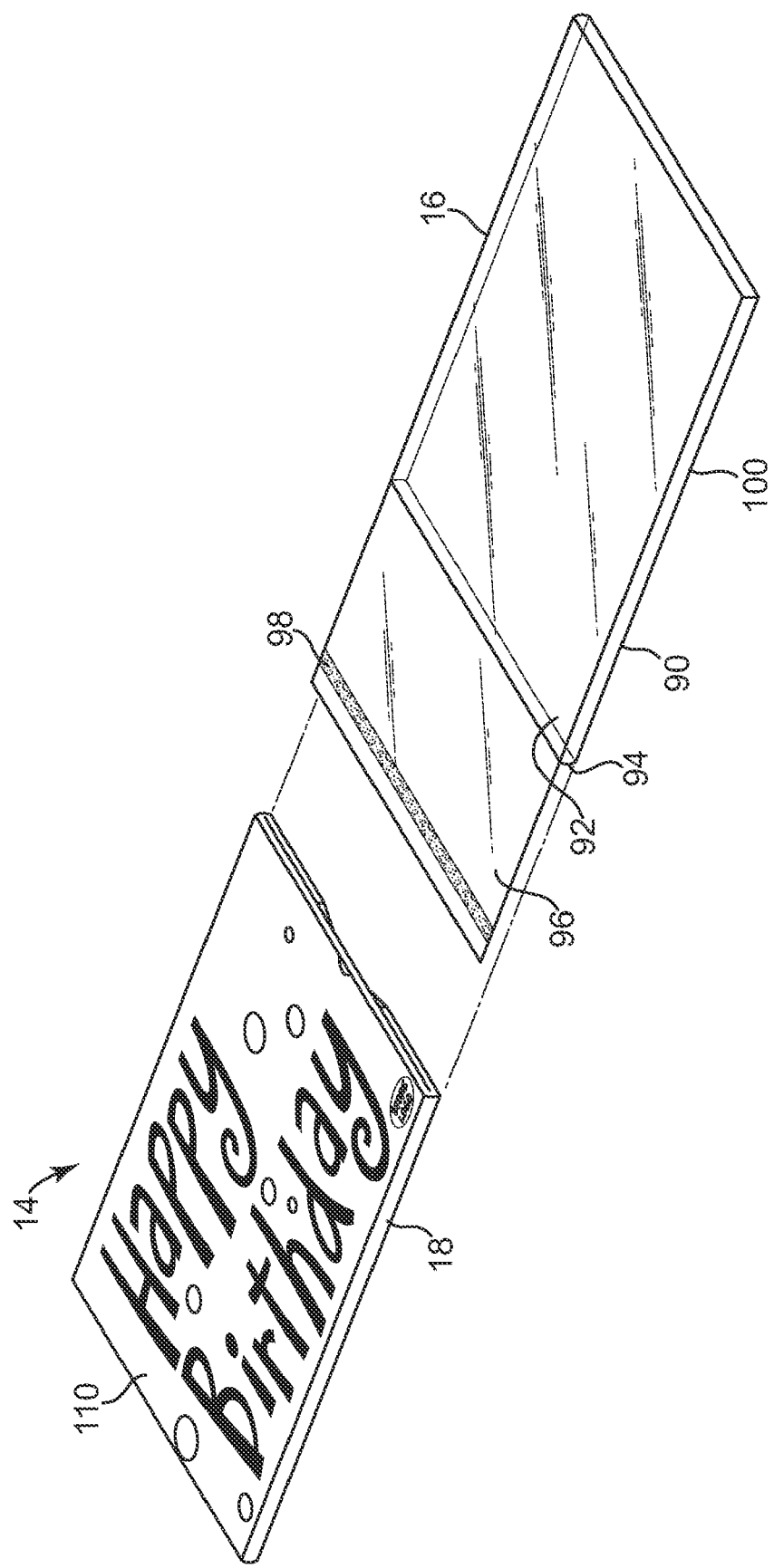
FIG. 8 is an exploded perspective view illustration of a packaged article of FIG. 1, according to one embodiment of the present invention.

FIG. 8 is an exploded perspective view illustrating one embodiment of packaged article 14 including package 16 and balloon 18. Package 16 may be formed in any suitable configuration or may be eliminated as will be apparent to those of skill in the art upon reading the present application. In one embodiment, package 16 is a transparent or translucent wrapper or bag that is substantially flexible and includes an enclosure portion 90 defining a compartment, which is generally indicated at 92, and an opening 94 providing access to compartment 92. A closure flap 96 extends from enclosure portion 90 beyond opening 94 and is configured to be manipulated to selectively cover opening 94. In one example, an end of flap 96 opposite enclosure portion 90 includes a strip of adhesive 98 such that, when flap 96 is folded to cover opening 94, strip of adhesive 98 contacts an outside surface 100 of enclosure portion 90 to secure flap 96 to enclosure portion 90 in a position covering opening 94.

Balloon 18 may take any one of a variety of forms and, in one embodiment, is configured to self-inflate upon user activation of balloon 18. Additionally referring to the exploded view illustration of FIG. 9, in one embodiment, balloon 18 includes a first member 110 and a second member 112, which collectively define an enclosure of balloon 18. In one example, first member 110 and second member 112 are each substantially planar and are sized similarly to one another. In one embodiment, first member 110 and second member 112 are each formed of a similar material, for example, aluminized biaxially-oriented polyethylene terephthalet (boPET) polyester (e.g., the polyester commonly known as Mylar® available from DuPont having headquarters in Wilmington, Del.).

Each of first member 110 and second member 112 is substantially planar and defines an inside surface 114 and an outside surface 116. Inside surfaces 114 are faced toward one another and are heat-sealed or otherwise suitably sealed to each another about a perimeter thereof (for example, as generally indicated with dashed lines at 137). In one embodiment, outside surfaces 116, which are positioned to face away from one another, include any variety of suitable demarcations 120, such as decorative indicia, brand indicia, etc.

Prior to sealing inside surfaces 114 of first member 110 and second member 112 to one another, in one example, chemical reactants 130 are placed between first member 110 and second member 112. When allowed to contact and react with one another, chemical reactants 130 are configured to interact with one another in a manner producing gas such as carbon dioxide, which fills balloon 18 thereby inflating balloon 18. More specifically, in one example, chemical reactants 130 include a first or acidic chemical reactant or component 132 and a second or basic chemical reactant or component 134. In one embodiment, at least one of acidic chemical reactant 132 and basic chemical reactant 134 are provided in a liquid form. For example, acidic chemical reactant 132 is provided in a liquid or solution form while basic chemical reactant 134 is provided in a powered, granule or other solid form. In one example, acidic chemical reactant 132 is a suitable quantity (e.g., about 15 milliliters) of a solution including about a 25% to 30% monohydrate citric acid in distilled water, and basic chemical reactant 134 is a suitable quantity (e.g., about 5 grams) of sodium bicarbonate in a granule form.

Acidic chemical reactant 132 and basic chemical reactant 134 are initially maintained separate from one another within balloon 18 using any suitable means as will be apparent to those of skill in the art upon reading the present application. In one example, one of acidic chemical reactant 132 and basic chemical reactant 134 is maintained in a liquid resistant bag 136, which is strong enough to initially hold the one of acidic chemical reactant 132 and basic chemical reactant 134 therein while being sufficiently thin or weak to be easily broken upon an application of force thereto. In one embodiment, such as where acidic chemical reactant 132 is in a liquid form, acidic chemical reactant 132 is initially sealed within bag 136 that is formed of a suitable clear plastic while basic chemical reactant 134 is placed directly within balloon 18 without pre-packaging. As such, bag 136 is one example of means for initially maintaining acidic chemical reactant 132 separate from basic chemical reactant 134 within balloon 18.

During assembly, balloon 18 is assembled by placing suitable quantities of acidic chemical reactant 132 and basic chemical reactant 134 on the corresponding inside surface 114 of first member 110 or second member 112 such that acidic chemical reactant 132 and basic chemical reactant 134 are separated from one another, for example, via bag 136 or any other suitable barrier. Once positioned on the one of first member 110 or second member 112, the other of first member 110 and second member 112 is aligned with and positioned over chemical reactants 130 opposite the one of first member 110 and second member 112. More specifically, inside surfaces 114 of first member 110 and second member 112 are faced toward one another with chemical reactants 130 being positioned therebetween.

Figure 9:
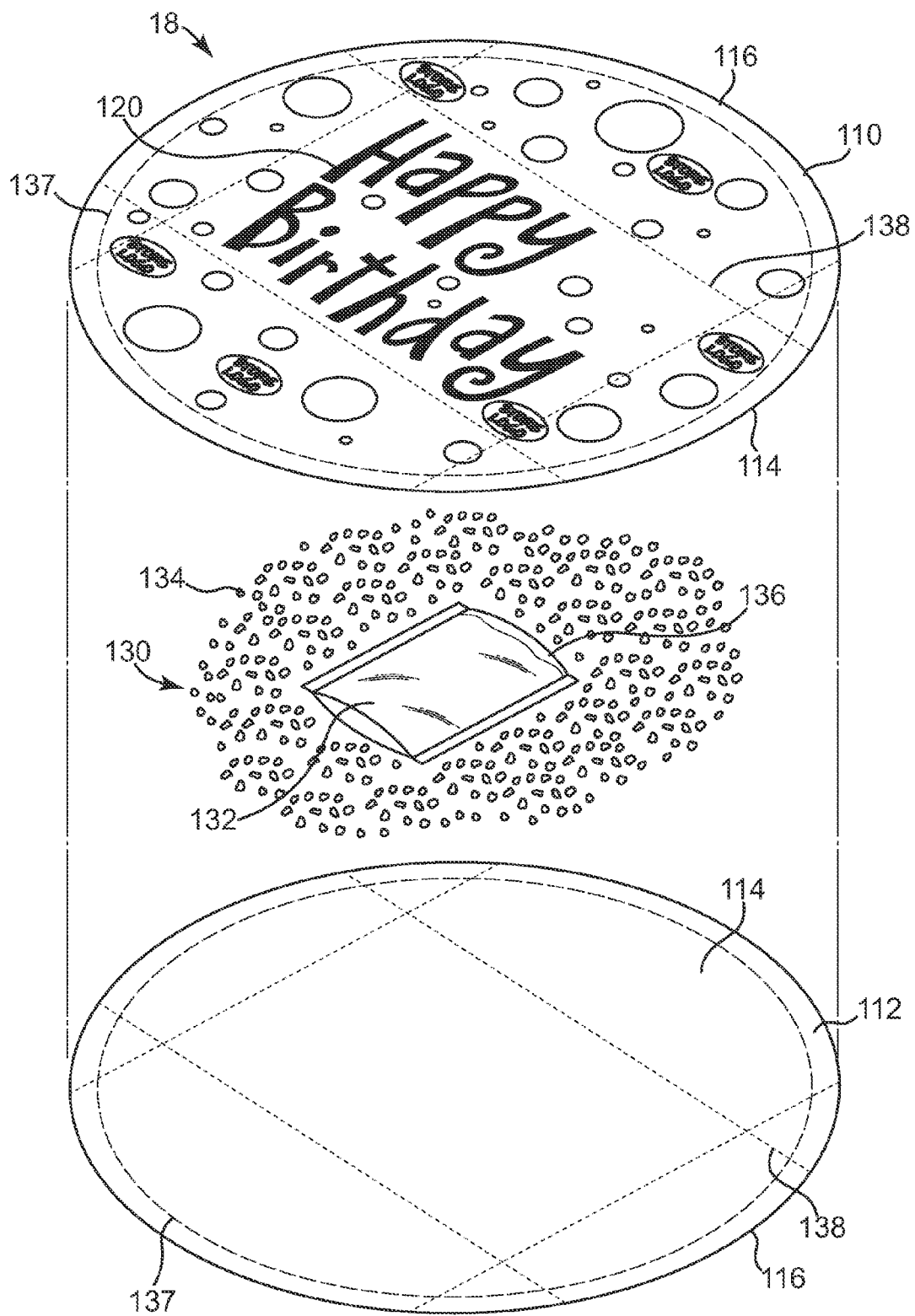
FIG. 9 is an exploded perspective view illustration of a balloon of FIG. 8, according to one embodiment of the present invention.

Once positioned, first member 110 and second member 112 are heat sealed or otherwise suitable coupled to one another, for example, around an entirety of a perimeter thereof as generally indicated by dashed lines 137 in FIG. 9, to enclose and seal chemical reactants 130 therebetween. In one embodiment, little or no air is trapped between first member 110 and second member 112 when they are sealed to one another such that the resultant balloon 18 is substantially flat, when in the deflated state, except for the inclusion of chemical reactants 130 therein. Although primarily described as being two entirely separate members 110 and 112, in other embodiments, a single sheet of suitable material may be used and folded on and sealed to itself to form balloon 18 in a manner enclosing chemical reactants 130 therein. Other methods of forming balloon 18 around chemical reactants 130 will be apparent to those of skill in the art upon reading this application.

Once balloon 18 is formed, inflatable article is placed within housing 12. For example, balloon 18 may be folded about fold lines generally indicated with dashed lines at 138 in FIG. 9 into a size and shape that is easily slid into package 16 or directly into first housing member 20. In one embodiment, as illustrated with reference to FIG. 8, folded balloon 18 is slid into compartment 92 of enclosure portion 90 of package 16. Once positioned therein, flap 96 of package 16 is rotated or folded to cover opening 94. In one embodiment, adhesive 98 of flap 96 (or otherwise positioned on or applied to enclosure portion 90 to interact with flap 96) is used to secure flap 96 relative to enclosure portion 90 in a manner covering opening 94 to form packaged article 14.

Additionally referring to FIG. 1, packaged article 14, or in one embodiment, balloon 18 without package 16, is slid into chamber 40 of first housing member 20, and second housing member 22 is coupled with first housing member 20 to enclose at least balloon 18 within housing 12, for example, within chamber 40 and/or cavity 60. More specifically, in one embodiment, first housing member 20 is slid toward and together with second housing member 22 such that flange 44 of first housing member 20 is received by the area of reduced thickness 64 of second housing member 22. In this manner, first and second housing members 20 and 22 are coupled to one another with a friction fit such that chamber 40 and cavity 60 are placed in communication with (i.e., are open to) one another to collectively define a storage compartment in housing 12. First and second housing members 20 and 22 are one example of means for enclosing packaged article 14 and therefore, balloon 18. First and second housing members 20 and 22 are, respectively, examples of means for defining chamber 40 and means for defining cavity 60. Since, in one embodiment, housing 12 is rigid, when balloon 18 is enclosed within housing 12, housing 12 protects balloon 18 from inadvertent or undesired inflation. Other methods of coupling first and second housing members 20 and 22 and/or enclosing package article 14 are also contemplated. As described above, housing 12 is formed of a substantially rigid material such that housing 12 protects balloon 18 from being impacted and activated while balloon 18 is maintained within housing 12.

In one embodiment, the resultant housing 12 is substantially rectangular and sized similarly to an identification card, a credit card or other card sized to fit in a wallet of a user; however, housing 12 may be slightly thicker to accommodate receipt of packaged article 14. In one embodiment, housing 12 is shaped as a square, circle, oval, star or another suitable shape. Housing 12 is one example of means for defining a storage compartment for selectively maintaining balloon 18.

During use of transaction product 10 for entertainment purposes, first and second housing members 20 and 22 are separated and packaged article 14 is removed from within first and second housing members 20 and 22. Upon removal of packaged article 14 from housing 12 and/or package 16, if any, balloon 18 is ready for activation. More specifically, referring to FIG. 10 upon removal of balloon 18 from housing 12 and/or packaging 16 and unfolding of balloon 18, balloon 18 is substantially flat.

A bearer impacts (e.g., via squeezing or hitting) with or otherwise applies a force F to transaction product 10, more specifically, to balloon 18 near bag 136 or any other barrier within balloon 18. Force F is configured to erode or destroy the prior separation of acidic chemical reactant 132 and basic chemical reactant 134 (i.e., to compromise bag 136 or other barrier) causing the acidic chemical reactant 132 and basic chemical reactant 134 to interact with one another to produce gas. The gas, which is maintained within balloon 18 via the perimeter heat seal, in turn, increases pressure within balloon 18 and moves at least portions of first member 110 and second member 112 away from each other (i.e., expanding the distance between first member 110 and second member 112) thereby inflating balloon 18 as indicated in FIG. 11 as compared to FIG. 10. More specifically, in one example, force F is sufficient and properly placed to cause bag 136 to break such that acidic chemical reactant 132 escapes bag 136 to interact with basic chemical reactant 134, which results in the production of carbon dioxide gas and inflation of balloon 18. In one example, force F used to break bag 136 is sufficiently low to allow a bearer to easily apply force F with her hands. In one embodiment, force F used to break bag 136 is less than about 2 kilograms, for example, about 1.5 kilograms. In view of the above, upon activation (i.e., application of force F to balloon 18, more specifically to bag 136), balloon 18 appears to self-inflate to the amusement of the bearer of transaction product 10 and/or any other observers. As such, chemical reactants 130 are one example of means for automatically expanding a distance between first member 110 and second member 112 upon application of force F to balloon 18.

Although primarily described herein as being applied following removal of balloon 18 from housing 12, in one example, force F may be applied to balloon 18 or another portion of transaction product 10 while balloon 18 is still enclosed within or otherwise coupled with housing 12. In one embodiment, force F is applied to any portion of transaction product 10 that will break or otherwise compromise bag 136 resulting in a production of gas, which, in turn, causes inflation of balloon 18. In one such embodiment, balloon 18 is configured to inflate while balloon 18 is still coupled with housing 12. In one example, bag 136 and chemical reactants 130 may initially be maintained outside of balloon 18, but are in communication with balloon 18 such that any production of gas resulting from the interaction of chemical reactants 130 will enter and fill balloon 18.

Once inflated, balloon 18 functions similar to any other balloon. In one example, as illustrated in FIG. 11, balloon 18 in the inflated state is no longer substantially flat as in the deflated state of FIG. 10. In the inflated state, balloon 18 displays any demarcations 120 or other indicia on outside surfaces 116 thereof. For example, balloon 18 may display a message to the user such as "Happy Birthday."

Figure 12:
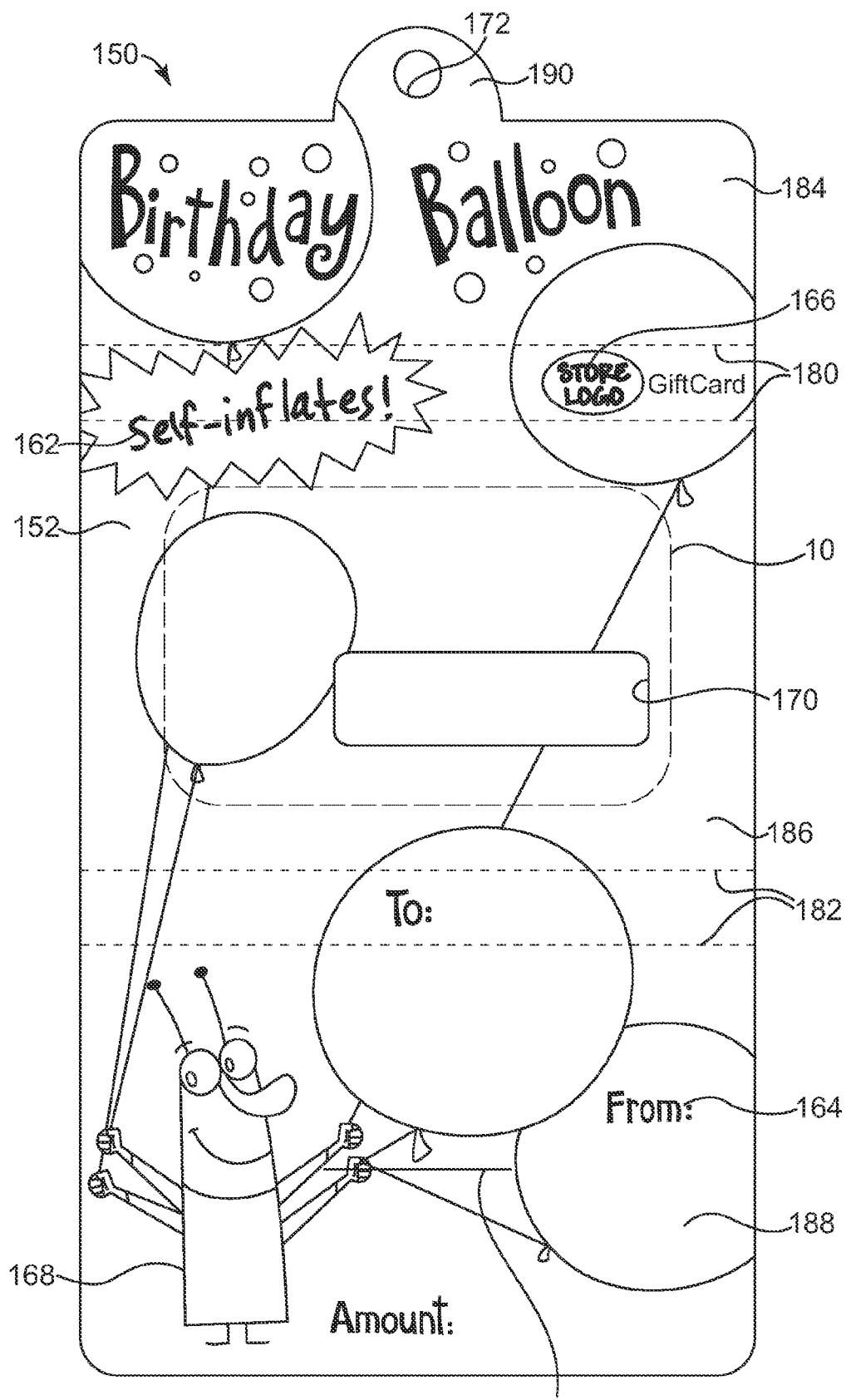
FIG. 12 is a front view illustration of a backer, according to one embodiment of the present invention.
Figure 13:
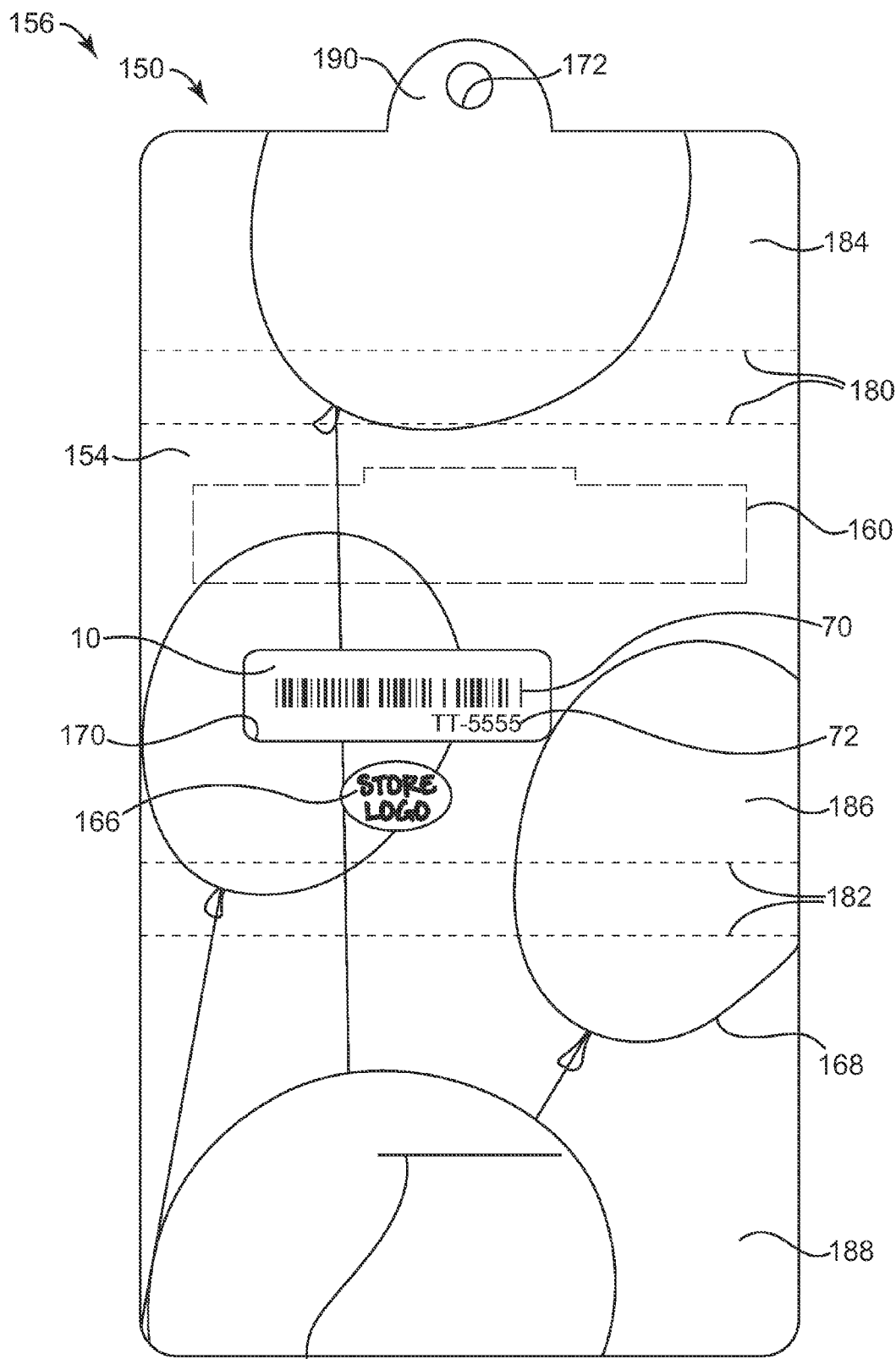
FIG. 13 is a rear view illustration of a transaction product assembly including the backer of FIG. 12 supporting the transaction product of FIG. 1, according to one embodiment of the present invention.

FIGS. 12 and 13 illustrate a carrier or backer 150 supporting transaction product 10 (FIGS. 1-6). Backer 150 comprises a single layer or multiple layers of paper or plastic material, for example, generally in the form of a relatively stiff but bendable/flexible card. Use of other materials to form backer 150 is also contemplated. Backer 150 defines a first or front surface 152 (FIG. 12) and a second or rear surface 154 (FIG. 13). Transaction product 10, which is generally represented in broken lines in FIG. 12 for illustrative purposes (e.g., to allow for full viewing of front surface 152), is readily releasably attached to backer 150, for example, by adhesive, blister packaging, overlying skinning material, clam shell packaging or the like, such that transaction product 10 and backer 150 collectively define a transaction product assembly 156.

In one embodiment, backer 150 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 152 and 154. In one example, the indicia include one or more of redemption indicia 160, instructional indicia 162, message field indicia 164, brand indicia 166, decorative indicia 168, etc.

Redemption indicia 160, which are generally indicated with a dashed box in FIG. 13, indicate that transaction product 10 is redeemable for the purchase of goods and/or services and that upon use, a value of the purchased goods and/or services will be deducted from the account or record linked to transaction product 10. In one embodiment, redemption indicia 160 include phrases such as "<NAME OF STORE> GiftCard" and "This GiftCard is redeemable for merchandise or services at any of our stores or at our website," and/or provides help or phone line information in case of a lost, stolen or damaged transaction product 10, etc.

Instructional indicia 162 include any indications generally referring to how transaction product 10 can be used for entertainment or functional purposes other than value redemption. For example, instructional indicia 162 indicate to the bearer that balloon 18 self-inflates or may otherwise instruct the bearer regarding how to activate inflation of balloon 18. In one example, one or both of instructional indicia 84 (FIG. 4) and instructional indicia 162 are included anywhere on transaction card assembly 156. Other instructional indicia 162 are also contemplated.

Message field indicia 164, for example, include "to," "from" and "amount" fields are configured to be written to by the bearer of transaction product assembly 156 prior to presenting transaction product assembly 156 to a recipient. As such, message field indicia 164 facilitate the consumer in preparing transaction product assembly 156 for gifting to a recipient. Brand indicia 166 identify a store, brand, department, etc. and/or services associated with transaction product 10.

Any suitable decorative indicia 168 may also be included on backer 150. In one embodiment, decorative indicia 168 are similar to or otherwise coordinate with demarcations 120 on outside surfaces of balloon 18. Any of indicia 160, 162, 164, 166, 168 or other indicia optionally may appear anywhere on backer 150 or transaction product 10. Additional information besides that specifically described and illustrated herein may also be included.

In one embodiment, backer 150 defines a window or opening 170 for displaying account identifier 70 of transaction product 10 as illustrated in FIG. 13. As previously described, account identifier 70 is adapted for accessing an account or record associated with transaction product 10 for activating, loading or debiting value from the account or record. Accordingly, in one embodiment, opening 170 allows access to account identifier 70 to activate and/or load transaction product 10 without removing transaction product 10 from backer 150.

In one embodiment, backer 150 defines a hanging aperture 172 configured to receive a support arm or hook, such that transaction product assembly 156 can be hung from a rail or rack within the retail setting or elsewhere to facilitate display of transaction product assembly 156. According to one embodiment, FIG. 13 illustrates surfaces of backer 150 that will be supported on a rack or other fixture while FIG. 12 illustrates surfaces of backer 150 that will be visible to a consumer of a retail store who is considering the purchase of transaction product assembly 156.

In one embodiment, backer 150 is configured to be folded about transaction product 10 to wrap transaction product 10 for presentation to a recipient. For example, in one embodiment, backer 150 includes fold lines 180 and 182, which extend substantially parallel to and are longitudinally spaced from one another to define a first panel 184, a second panel 186 and a third panel 188 of backer 150. For example, second panel 186 extends between first panel 184 and third panel 188. First panel 184 and second panel 186 are divided by fold lines 180, and second panel 186 and third panel 188 are divided by fold lines 182. In one embodiment, transaction product 10 is secured to second panel 186 such that, upon folding backer 150 about fold lines 180 and 182, first panel 184 and third panel 188 are folded relative to second panel 186 to at least partially overlap one another and to substantially enclose transaction product 10 within folded backer 150.

In one embodiment, backer 150 defines a tab 190 and a corresponding slit 192. More specifically, one of first panel 184 and third panel 188 defines one of tab 190 and slit 192, and the other of first panel 184 and third panel 188 defines the other of tab 190 and slit 192. In this configuration, when backer 150 is folded about fold lines 180 and 182, slit 192 receives tab 190 to selectively hold backer 150 in a folded or closed configuration. Other methods of folding backer 150 and/or maintaining backer 150 in a folded configuration will be apparent to those of skill in the art upon reading this application. In one embodiment, a non-foldable backer may be used as an alternative to or in addition to backer 150.

Figure 14:
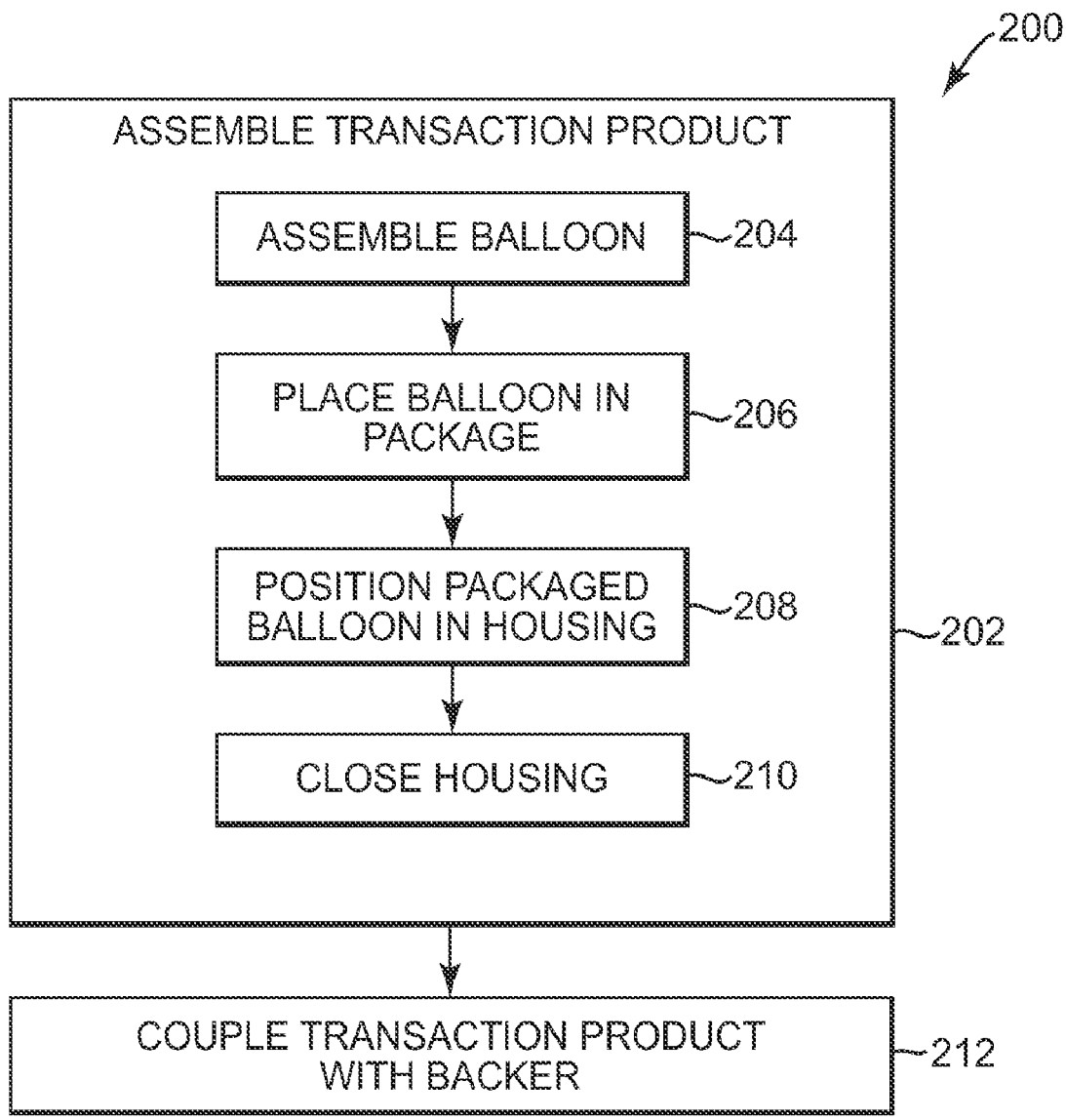
FIG. 14 is a flow chart illustrating a method of assembling a transaction product assembly, according to one embodiment of the present invention.

FIG. 14 is a flow chart illustrating one embodiment of a method 200 of assembling transaction product assembly 156. Additionally referring to FIGS. 1-9, at 202, transaction product 10 is assembled. More specifically, at 204, balloon 18 is assembled by sealing chemical reactants 130 between first member 110 and second member 112 in a similar manner as described above. At 206, balloon 18 is folded, for example, along fold lines 138 and is placed into package 16. Package 16 is closed to enclose balloon 18 therein forming packaged article 14. In one embodiment, package 16 and, therefore, operation 206 may be eliminated.

At 208, packaged article 14 or balloon 18 by itself where package 16 is eliminated is positioned within housing 12. More specifically, referring to FIG. 1, packaged article 14 is slid at least partially into one of chamber 40 of first housing member 20 and cavity 60 of second housing member 22. Subsequently, at 210, first and second housing members 20 and 22 are slid and coupled together. More specifically, flange 44 of first housing member 20 is received by area of reduced thickness 64 of second housing member 22. As such, first housing member 20 and second housing member 22 are coupled together via a friction fit such that packaged article 14 is enclosed therebetween within chamber 40 and/or cavity 60. In one embodiment, a sticker, label, etc. (not shown) may be placed to contact first housing member 20 and second housing member 22 to prevent or decrease tampering or undesired opening of housing 12.

At 212, the assembled transaction product 10 is coupled with backer 150 to form transaction product assembly 156 as illustrated with additional reference to FIG. 13. In one example, transaction product 10 is coupled to backer 150 with an adhesive, clam shell, blister pack, overlying skinning material or other selectively releasable material or device such that account identifier 70 is viewable through opening 170 of backer 150 as illustrated in FIG. 13.

Figure 15:
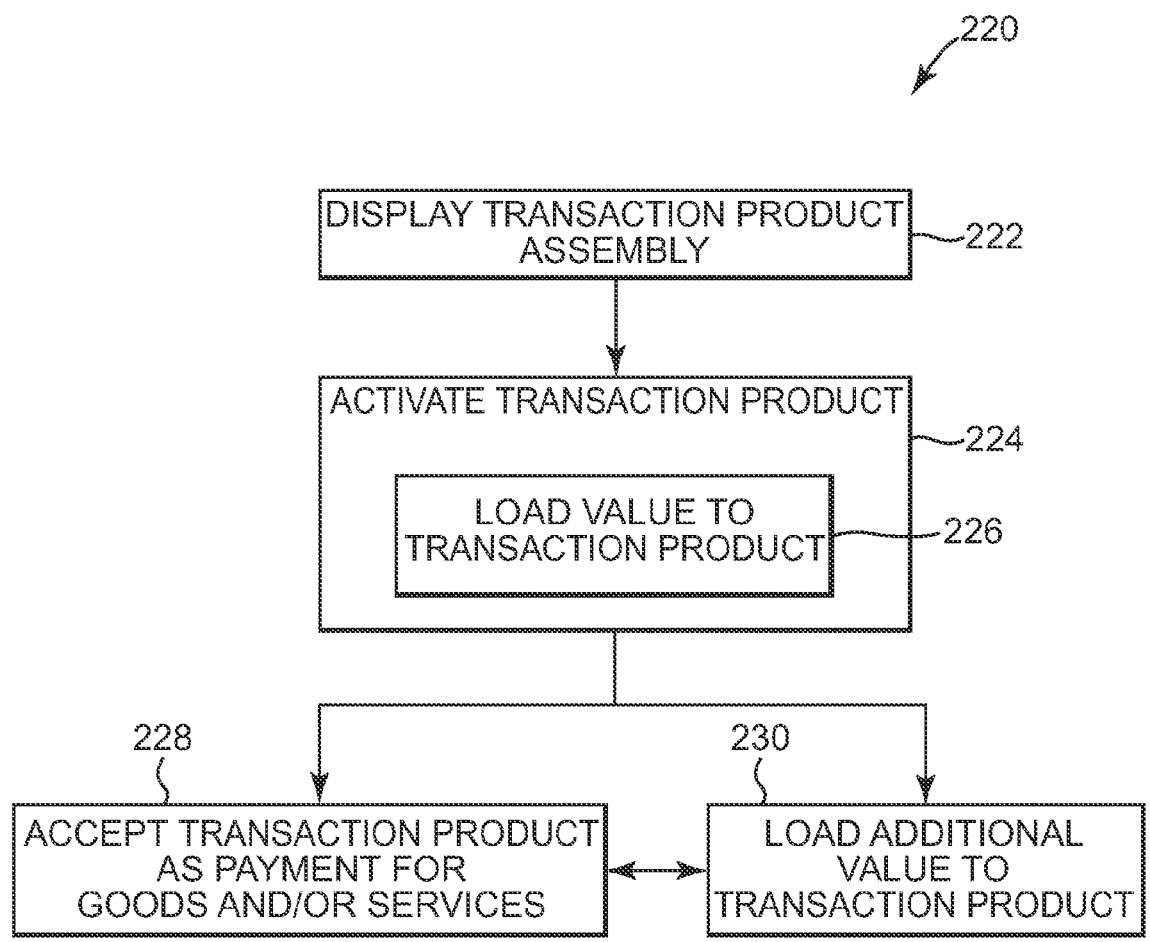
FIG. 15 is a flow chart illustrating a method of providing a transaction product, according to one embodiment of the present invention.

FIG. 15 is a flow chart illustrating one embodiment of a method 220 of providing transaction product assembly 156 for sale to and for use by consumers. At 222, transaction product assembly 156 is placed or hung from a rack, shelf or similar device to display transaction product assembly 156 for sale to potential consumers. In one example, transaction product assembly 156 is placed for sale such that transaction product 10 is visible to potential consumers. In one embodiment, a depiction of transaction product 10 and/or transaction product assembly 156 is placed on a website for viewing and purchase by potential consumers. In one embodiment, transaction product 10 is displayed without backer 150.

At 224, a consumer, who has decided to purchase transaction product 10, presents transaction product assembly 156 or at least transaction product 10 to a retail store employee, retail store kiosk or other person or device to scan account identifier 70 of transaction product 10 (e.g., through opening 170 in backer 150) to access the account or record linked to account identifier 70. Upon accessing the account or record, the account or record is accessed and value is added thereto. Thus, transaction product 10 is activated and loaded. Once transaction product 10 is activated and loaded, transaction product 10 can be used by the consumer or any other bearer of transaction product 10 to purchase goods and/or services at the retail store or other affiliated retail setting or website.

In one example, a predetermined value is associated with transaction product 10 (i.e., associated with the account or record linked to transaction product 10 via account identifier 70) prior to activation and display, but such predetermined value is not initially available for use toward the purchase or use of goods and/or services. In such an embodiment, at 224, transaction product 10 is activated to permit subsequent access to the predetermined value (e.g., subsequent loading on and debiting from the account or record) and no additional value is added during activation such that operation 226 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes or other goods/services. In one embodiment, where transaction product 10 is displayed on a web site at 222, then, at 224, transaction product 10 may be activated in any suitable method and may not require machine scanning of account identifier 70 to be activated or to otherwise access the associated account or record such as at 226.

At 228, the retail store or other affiliated retail setting or website accepts transaction product 10 as payment toward the purchase of goods and/or services made by the current bearer of transaction product 10. In particular, the value currently loaded on transaction product 10 is applied toward the purchase of goods and/or services. At 230, additional value is optionally loaded on transaction product 10 at a point-of-sale terminal, kiosk or other area of the retail store or related setting. Upon accepting transaction product 10 as payment at 228, the retail store or related setting can subsequently perform either operation 228 again or operation 230 as requested by a current bearer of transaction product 10. Similarly, upon loading additional value to transaction product 10 at 230, the retail store or related setting can subsequently perform either operation 230 again or operation 228. In one example, the ability to accept transaction product 10 as payment for goods and/or services is limited by whether the financial account or record associated with transaction product 10 has any value at the time of attempted redemption.

Figure 16:
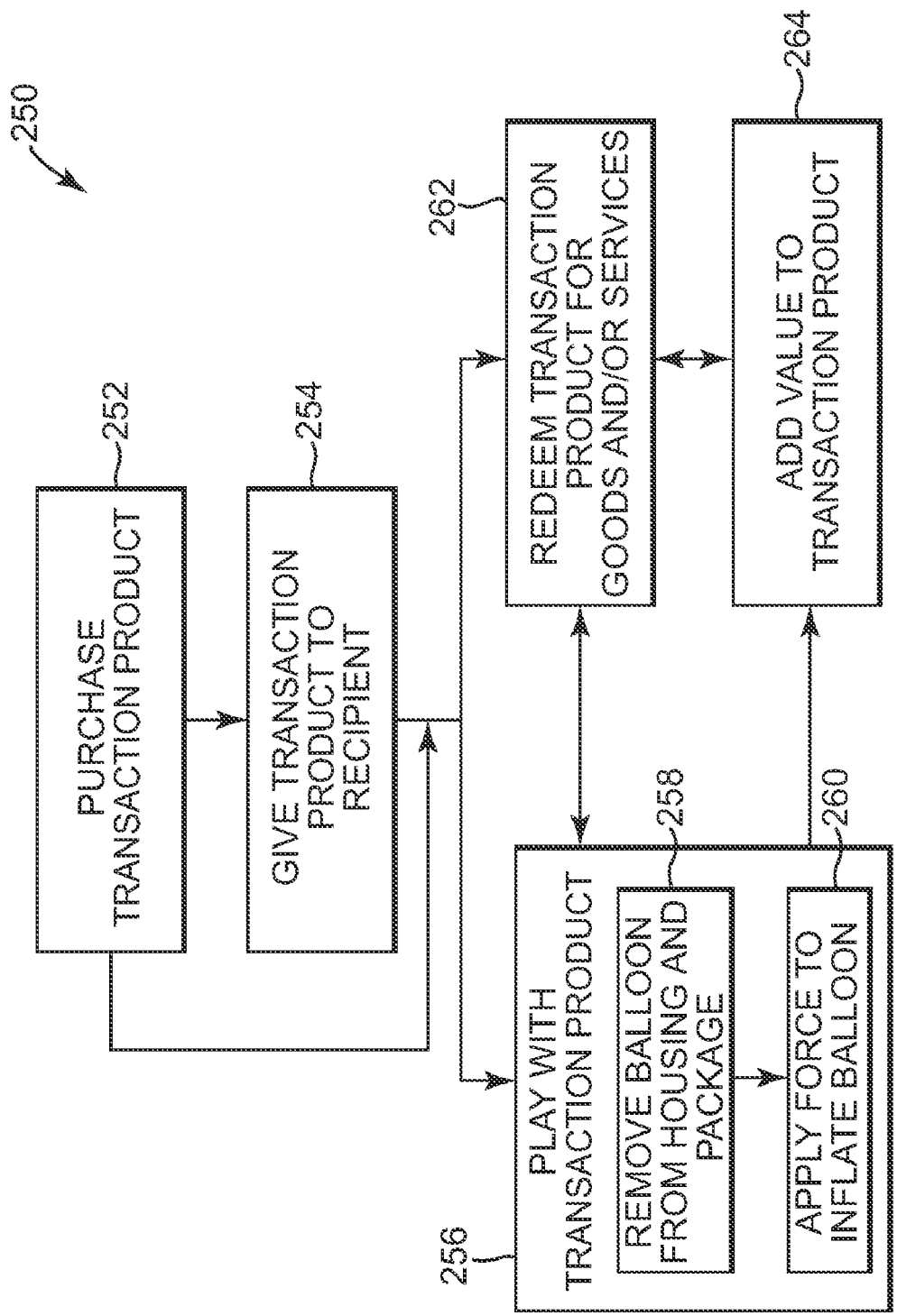
FIG. 16 is a flow chart illustrating a method of using a transaction product, according to one embodiment of the present invention.

FIG. 16 is a flow chart illustrating one embodiment of a method 250 of using transaction product 10. At 252, a potential consumer of transaction product 10, which is displayed in a retail store or viewed on a website, decides to and does purchase transaction product 10 from the retail store or website setting. Transaction product 10 can be displayed and purchased alone or as part of transaction product assembly 156. Upon purchasing of transaction product 10, a retail store employee, retail store kiosk or other person/machine scans account identifier 70 and to thereby activate or load value onto transaction product 10.

At 254, the consumer optionally gives transaction product 10 to a recipient, such as a graduate, relative, friend, expectant parents, one having a recent or impending birthday, a couple having a recent or impending anniversary, etc. As an alternative, the consumer can keep transaction product 10 for his or her own use and operation 254 can be eliminated.

At 256, the consumer or recipient, whoever is in current ownership or otherwise is the current bearer of transaction product 10, plays with transaction product 10 or otherwise uses transaction product 10 in a non-transactional capacity. More specifically, the bearer removes transaction product 10 from backer 150, if transaction product 10 is coupled with backer 150. The bearer opens housing 12 by separating first housing member 20 from second housing member 22 to access packaged article 14 stored therein. As such, at 258, packaged article 14 is selectively removed from housing 12, and balloon 18 is removed from package 16.

Once balloon 18 is removed from housing 12, at 260, the bearer of transaction product 10 impacts (e.g., squeezes, punches or hits) balloon 18 in an area generally corresponding with a location of bag 136 within balloon 18 to break bag 136. The breaking of bag 136 with a single impact (i.e., a single application of force F) by the bearer allows chemical reactants 130 to contact and react with one another producing gas, which automatically inflates balloon 18 as described above. In one embodiment, shaking of balloon 18 after impact speeds inflation by encouraging chemical reactants 130 to interact with one another. The self-inflation of balloon 18 following activation by the bearer of transaction product 10 amuses the bearer and/or any other observers thereof. In addition, following self-inflation, balloon 18 remains inflated for a substantial length of time, for example, for over 500 hours, providing the bearer additional joy and amusement.

At 262, the current bearer of transaction product 10 redeems transaction product 10 for goods and/or services from the retail store or website. For example, before or following play at 256, transaction product 10 as a whole is redeemed toward the purchase or use of goods and/or services at 262. In one embodiment, following playing with transaction product at 256, housing 12 is redeemed toward the purchase or use of goods and/or services. Any other portion of transaction product 10 alone can be redeemed toward the purchase or use of goods and/or services provided that portion of transaction product 10 includes account identifier 70.

At 264, the current bearer of transaction product 10 optionally adds value to transaction product 10, and more particularly, to the account or record associated with transaction product 10, at the retail store or over the Internet. Upon playing with transaction product 10 at 256, redeeming transaction product 10 at 262 or adding value to transaction product 10 at 264, the current bearer of transaction product 10 subsequently can perform any of operations 256, 262 or 264 as desired. In one embodiment, the ability of the current bearer to repeat redeeming transaction product 10 at 262 is limited by whether the financial account or record associated with transaction product 10 has any value at the time of attempted redemption. In one embodiment, only balloon 18 and not housing 12 is used in playing with transaction product 10 at 256. As such, in one example, operation 256 and either operation 262 or operation 264 can be simultaneously performed.

Although described above as occurring at single retail store or website, in one embodiment, purchasing transaction product 10 at 252, redeeming transaction product 10 at 262 and adding value to transaction product 10 at 264 can each be performed at any one of a number of stores adapted to accept transaction product 10 or over the Internet. In one example, the number of stores are each a part of a chain or similarly branded stores. In one example, the number of stores includes at least one website and/or at least one conventional brick and mortar store.

Transaction products come in many forms, according to embodiments of the invention. The gift card, like other transaction products, can be "recharged" or "reloaded" at the direction of the original consumer, the gift recipient or third party. The term "loading on" or "loaded on" herein should be interpreted to include adding the balance of a financial account or record associated with the corresponding transaction product. The balance associated with a transaction product declines as the transaction product is used (i.e., as value deductions are made), encouraging repeat visits. The transaction product remains in the purse or wallet of the user, serving as an advertisement or reminder to revisit the associated merchant. Transaction products, according to embodiments of the invention, provide a number of advantages to both the consumer and the merchant. Other gift cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction product comprising:
a housing;
an article selectively maintained within the housing, wherein following complete removal of the article from the housing, the article is configured to self-inflate upon activation of the article by a bearer of the transaction product; and
an account identifier associated with the housing and linking the transaction product to an account or record having a value configured to be used toward one or more of a purchase and a use of goods or services.

2. The transaction product of claim 1, wherein the account identifier is at least partially machine readable and includes one or more of a bar code, a magnetic strip, a smart chip or a radio frequency identification (RFID) device.

3. The transaction product of claim 1, wherein the article is configured to fully inflate upon bearer application of a single impact to the article.

4. The transaction product of claim 1, wherein the article includes chemical reactants maintained within a sealed enclosure such that at least one of the chemical reactants is initially separated from another of the chemical reactants, and wherein upon activation of the article, the chemical reactants all interact with one another producing a gas, which inflates the article.

5. The transaction product of claim 4, wherein the chemical reactants include a basic reactant and an acidic reactant, and wherein the gas includes carbon dioxide.

6. The transaction product of claim 4, wherein the article is sealed to substantially maintain the gas within the article.

7. The transaction product of claim 4, wherein one of the chemical reactants is maintained within a bag positioned within the article, and activation of the article is configured to break the bag.

8. The transaction product of claim 1, wherein the article is folded over itself to fit within the housing.

9. The transaction product of claim 1, further comprising a package enclosing the article, wherein the package and the article are each maintained within the housing.

10. The transaction product of claim 1, wherein the housing comprises a first housing member and a second housing member configured to be selectively coupled with one another to selectively close the housing and configured to be entirely separated from one another to selectively open the housing, wherein the article is maintained between the first housing member and the second housing member when the housing is closed.

11. The transaction product of claim 1, wherein the housing is one of transparent and translucent, and the article can be at least partially viewed through the housing.

12. A transaction product comprising:
a housing;
an article selectively maintained within the housing, wherein following removal of the article from the housing, the article is configured to self-inflate upon activation of the article by a bearer of the transaction product; and
an account identifier associated with the housing and linking the transaction product to an account or record having a value configured to be used toward one or more of a purchase and a use of goods or services;
wherein the housing is substantially rigid and configured to protect the article from undesired activation while the article is maintained within the housing.

13. A stored-value card comprising:
a balloon including a first member and a second member;
means for automatically expanding a distance between the first member and the second member upon application of a force to the balloon;
means for linking the stored-value card with an account or record having a value associated therewith such that the stored-value card can be applied toward one of a payment and a use of one or more of goods and services; and
means for defining a storage compartment, wherein the balloon is folded over itself and selectively maintained within the storage compartment to prevent undesired expansion of the balloon while the balloon is maintained within the storage compartment.

14. The stored-value card of claim 13, wherein the means for defining the storage compartment is one of transparent and translucent such that at least a portion of the balloon can be viewed through the means for defining the storage compartment when the balloon is maintained therein.

15. The stored-value card of claim 13, wherein the means for automatically expanding the distance between the first member and the second member includes an acidic component and a basic component configured to produce a gas when combined with one another.

16. The stored-value card of claim 15, further comprising means for initially maintaining the acidic component separate from the basic component within the balloon, wherein the means for initially maintaining is configured to be compromised upon application of a force to the balloon by a bearer of the stored-value card in a manner allowing the acidic component to contact the basic component.

17. The stored-value card of claim 13, wherein the means for defining the storage compartment is formed of a substantially rigid material.

18. A method of providing and supporting use of a financial transaction card, the method comprising:
displaying the financial transaction card to potential consumers, the financial transaction card including a casing, a deflated article, chemical components and a barrier initially maintaining at least two of the chemical components separate from one another, wherein:
the deflated article and chemical components are fully enclosed within the casing,
the transaction card is configured such that upon complete removal of the deflated article from the casing and application of a force to a portion of the deflated article near the barrier, the barrier is compromised and the chemical components interact with one another producing a gas, which inflates the deflated article, and
displaying the financial transaction card includes indicating to potential consumers that the deflated article is configured to inflate upon application of the force to the financial transaction card;
activating the financial transaction card to permit value deductions from a financial account or record linked to the financial transaction card via an account identifier included on the financial transaction card; and
receiving the financial transaction card as payment for one or more of goods and services, the value of the one or more of goods and services being deducted from the financial account or record.

19. The method of claim 18, wherein displaying the financial transaction card includes displaying the financial transaction card such that the deflated article is viewable through the casing, which houses the deflated article and is one of transparent and translucent.

20. A method of assembling a transaction product, the method comprising:
    providing a housing defining a chamber therein and including an account identifier linking the housing to an account or record;
    assembling a balloon enclosing chemical components such that the chemical components are initially separated from one another within the balloon, wherein, upon contact with one another, the chemical components are configured to produce a gas to inflate the balloon;
    enclosing the balloon in a flexible packaging independently from the housing;
    placing the balloon and the flexible packaging within the chamber; and
    closing the chamber such that the balloon and the flexible packaging are enclosed within the housing.

21. The method of claim 20, wherein enclosing the balloon in the flexible packaging includes folding the balloon over itself and placing the folded balloon into the flexible packaging.

* * * * *